United States Patent Office 3,366,709
Patented Jan. 30, 1968

3,366,709
GRAFTING VINYL HALIDE ONTO OLEFIN-VINYLIDENE CHLORIDE COPOLYMER
Massimo Baer, Longmeadow, Mass., assignor to Monsanto Company, a corporation of Delaware
No Drawing. Filed Dec. 30, 1963, Ser. No. 334,619
5 Claims. (Cl. 260—878)

This invention relates to polyblends of vinyl halide polymers and more particularly the invention relates to vinyl halide graft polymer compositions having improved physical and low temperature properties.

Vinyl halide and particularly vinyl chloride polymers and copolymers are used extensively in sheets and films, coatings and molded objects. However, articles made from polyvinyl chloride and copolymers thereof are generally considered to be deficient in certain physical properties such as impact strength and low temperature pliability.

In general, the problem of improving low temperature pliability and impact strengths of vinyl halide polymers has been resolved to a fair extent by the addition of liquid plasticizers or by physically blending with macromolecular products such as chloroprene, butadiene-acrylonitrile, butadiene-styrene, chlorinated and sulfochlorinated polyolefins. Unfortunately these methods have generally been successful only at the expense of sacrificing one or more other desirable properties such as rigidity, clarity, tensile strength, solvent resistance, high heat distortion point, chemical resistance, and the like. In end use applications such as the formation of bottles, the necessity for maintaining optimum properties is most acute. As a result, the use of vinyl halide polymers in applications such as bottles, tenacious leather-like materials and the like has been severely limited.

Within fairly recent times, graft polymer products and processes have been developed. These graft polymers are formed from a main chain or trunk polymer onto which are grafted side chains or branches of a different chemical structure. Although various methods of grafting have been published, only a small number of theoretically foreseen graft polymers have been prepared effectively. This is partly because the characteristics of the graft polymer are generally unpredictable and differ substantially from those of the copolymer and partly because graft polymerization is sometimes difficult or impossible under certain conditions even though copolymerization may be readily accomplished.

In accordance with the present invention, it has now been found that polymer blends of polyvinyl halide and vinyl halide grafted to a copolymer of an olefin of the ethylene series and vinylidene chloride can be prepared which have unusual and improved physical properties. In particular, these polymer blends have unusual and improved low temperature toughness and flexibility.

Accordingly, it is a principal object of this invention to provide vinyl halide graft polymer compositions having unusual and improved physical properties.

Another object is to provide a method by which to attain the preceding objects.

Other objects of this invention will in part be obvious and will in part appear hereinafter.

These and other objects are attained by the polymerization of vinyl halide monomer in the presence of a copolymer of an olefin of the ethylene series and vinylidene chloride.

The following examples are given to illustrate the invention and are not intended as limitations thereof. Unless otherwise specified quantities are mentioned on a weight basis.

EXAMPLE I

Ten parts of a copolymer of 60 parts of ethylene and 40 parts of vinylidene chloride (specific viscosity of 0.40 gram of copolymer in 100 ml. of cyclohexanone at 25° C.=0.37) are dissolved in 90 parts of vinyl chloride monomer at a temperature of 60° C. The resulting solution is then charged to an air evacuated pressure vessel containing 160 parts water, 0.30 part methylcellulose (5.5–7.0 hydroxy propyl, 22–23% methoxy content; viscosity of 2% aqueous solution at 20° C. equal 100 cps.) and 0.24 part lauroyl peroxide.

Polymerization is carried out under agitation at 50° C. for 16 hours. After venting of small quantities of unconverted monomer, 96 parts of a homogeneous granular resin are obtained. The dry resin passes 100% through a 40 mesh screen and has a specific viscosity of about 0.57 (0.40 gram in 100 ml. cyclohexanone at 25° C.).

EXAMPLE II

The process of Example I is repeated three separate times using the same procedure and ingredients of Example I except that the ratio of copolymer to vinyl chloride monomer charged is varied as follows for each separate run:

| Run No. | Parts Copolymer | Parts Vinyl Chloride Monomer |
|---|---|---|
| 1 | 5 | 95 |
| 2 | 15 | 85 |
| 3 | 25 | 75 |

In each instance the conversion of monomer to polymer is over 90% producing a dry resin which passes 100% through a 40 mesh screen.

EXAMPLE III

The process of Example I is repeated three separate times using the same procedure and proportion of copolymer to vinyl chloride monomer charged except that the ratio of ethylene to vinylidene chloride in the copolymer is as follows for each of the three runs:

| Run No. | Copolymer | |
|---|---|---|
| | Proportion of Ethylene | Proportion of Vinylidene Chloride |
| 1 | 40 | 60 |
| 2 | 50 | 50 |
| 3 | 70 | 30 |

In each instance the conversion of monomer to polymer is over 90% producing a dry resin which passes 100% through a 40 mesh screen.

EXAMPLE IV

The process of Example I is repeated using the same procedures and ingredients except that 10 parts of a copolymer of 60 parts of isobutylene and 40 parts of vinylidene chloride (specific viscosity of 0.40 gram of copolymer in 100 ml. of cyclohexanone=0.26) are used in place of the copolymer of Example I. The conversion of monomer to polymer is over 90% with good grafting efficiency.

EXAMPLE V

One hundred parts of the resin obtained in Example I are mixed with 2.5 parts of cadmium laurate and 0.5 part dibutyl tin dilauryl mercaptide stabilizer on a mill roll at 300° F. Portions of the milled sheet taken at different intervals of time are molded into slabs one-eighth inch thick and cut into test specimens. For tensile and heat distortion tests, the specimens measure one half by one eighth by five inches in length. The specimens for impact testing measure one half by one eighth by two and one-half inches. A physical mixture or mechanical blend of polyvinyl chloride homopolymer and the same copolymer used to prepare the graft blend of Example I in equivalent proportions are milled for the purposes of comparison. ASTM test results as shown in Table I are as follows:

TABLE I

|  | Graft Blend | Mechanical Blend |
|---|---|---|
| Izod Impact Strength (ft.-lbs./in.): |  |  |
| 5 minutes milling | 15 | 2.7 |
| 15 minutes milling | 20.5 | 2.5 |
| 25 minutes milling | 18.5 | 2.0 |
| Heat Distortion Temp., °C | 66 | 68 |
| Tensile Strength, p.s.i. yield | 6,200 | 5,100 |
| Percent Elongation, yield | 4.0 | 3.1 |
| Tensile Modulus, p.s.i. | $3.3 \times 10^5$ | $3.1 \times 10^5$ |

As is apparent from Table I above, superior property results are obtained on the graft blend as opposed to the mechanical blend even though the proportions of the various ingredients are the same.

EXAMPLE VI

One hundred parts of the resin obtained in Example I are mixed with 2.5 parts of cadmium laurate and 0.5 part dibutyl tin dilauryl mercaptide stabilizer on a mill roll at 300° F. Portions of the milled sheet taken at different intervals of time are molded into slabs one-eighth inch thick and cut into test specimens. For tensile and heat distortion tests, the specimens measure one half by one eighth by five inches in length. The specimens for impact testing measure one half by one eighth by two and one-half inches. A graft blend prepared by polymerizing vinyl chloride monomer in the presence of polyethylene according to the procedure set forth in U.S. Patent 2,947,719 and in equivalent monomer:polymer proportions as that used to prepare the blend of Example I is milled for the purposes of comparison. ASTM test results as shown in Table II are as follows:

TABLE II

|  | Ethylene: Vinylidene Chloride Copolymer Graft Blend | Polyethylene Graft Blend |
|---|---|---|
| Izod Impact Strength (ft.-lbs./in.): |  |  |
| 5 minutes milling | 15 | 2.27 |
| 15 minutes milling | 20.5 | 6.40 |
| 25 minutes milling | 18.5 | 2.25 |
| Heat Distortion Temp., °C | 66 | 67 |
| Tensile Strength, p.s.i. yield | 6,200 | 6,140 |
| Percent Elongation, yield | 4.0 | 4.2 |
| Tensile Modulus, p.s.i. | $3.3 \times 10^5$ | $2.83 \times 10^5$ |

As apparent from Table II above, superior property results are obtained on the ethylene:vinylidene copolymer graft as opposed to the polyethylene graft.

EXAMPLE VII

One hundred parts of the resin obtained in Example I are mixed with 2.5 parts of a commercial barium-cadmium soap stabilizer on a mill roll at 300° F. Portions of the milled sheet taken after 15 minutes milling are molded into slabs one-eighth inch thick and cut into test specimens. For tensile and heat distortion tests, the specimens measure one half by one eighth by five inches in length. The specimens for impact testing measure one half by one eighth by two and one-half inches. A graft blend prepared by polymerizing vinyl chloride monomer in the presence of chlorinated polyethylene (chlorine content=31.8% by weight) in equivalent monomer:polymer proportions as that used to prepare the blend of Example I is milled for 15 minutes for the purpose of comparison. ASTM test results as shown in Table III are as follows:

TABLE III

|  | Ethylene: Vinylidene Chloride Copolymer Graft Blend (Ex. I) | Chlorinated Polyethylene Graft Blend |
|---|---|---|
| Izod Impact Strength (ft.-lbs./in.): |  |  |
| At 23° C | 20 | 19 |
| At 0° C | 18 | 7 |
| At −20° C | 16 | 1.5 |
| Heat Distortion Temp., °C | 66 | 68.5 |
| Tensile Strength, p.s.i. yield | 6,200 | 6,200 |
| Percent Elongation, yield | 4.0 | 4.0 |
| Tensile Modulus, p.s.i. | $3.3 \times 10^5$ | $3.1 \times 10^5$ |

The superior low temperature toughness of the ethylene vinylidene chloride copolymer graft over the chlorinated polyethylene graft is shown in Table III. The superior toughness at lower temperatures is due to the fact that for approximately equivalent chlorine content in both rubbers, the ethylene vinylidene chloride copolymer graft has considerably lower Tg than the chlorinated polyethylene graft. A rubber in order to perform as a toughening agent at low temperatures should have the lowest possible Tg.

The graft blends formed in the practice of the present invention are those wherein 60 to 98% by weight of an ethylenically unsaturated monomer is polymerized in the presence of 40 to 2% by weight of a copolymer of an olefin and vinylidene chloride and more preferably where 80 to 95% by weight of an ethylenically unsaturated monomer is polymerized in the presence of 20 to 5% by weight of a copolymer of an olefin and vinylidene chloride. The copolymer of an olefin and vinylidene chloride is one wherein the olefin is a member of the ethylene series having a carbon content less than 8 carbon atoms. The ethylene series is considered to be that group of unsaturated hydrocarbons of the general formula $C_nH_{2n}$ which contain one double bond.

The ethylenically unsaturated monomer used in effecting the graft polymerization comprises at least 80% by weight of vinyl halide and may include up to 20% of other ethylenically unsaturated monomers copolymerizable therewith. Thus, vinylidene halide, vinyl esters of organic acids, acrylonitrile, acrylates, methacrylates, maleates, fumarates and other unsaturated organic compounds can be used as comonomers. In addition, polymers made from vinyl halide and two or more comonomers are also applicable. Of the four vinyl halides, vinyl chloride is preferred.

The graft polymer can be conveniently prepared by dissolving the olefin:vinylidene chloride copolymer in the vinyl halide monomer and then polymerizing the monomer. Although suspension polymerization is the preferred procedure with respect to production volume, ease of recovery and physical form of resins, this invention is not restricted thereto. Polymerization may also be carried out by mass, solution, or emulsion techniques.

Briefly describing the preferred suspension polymerization process, water, suspending agent and copolymer are charged to an agitated pressure vessel. The vessel is sealed and substantially evacuated of air to substantially eliminate oxygen after which cold vinyl monomer is added and the resulting mixture agitated at temperatures anywhere between 20–100° C., to disperse the olefin:vinylidene chloride copolymer in the vinyl monomer. After the copolymer has substantially dispersed, the initiator is added and the polymerization allowed to proceed at temperatures of about 10–80° C., and more preferably, 45–65° C., until the pressure drops below 60 p.s.i.g. The remaining monomer is then vented off and the resin recovered by centrifuging and drying. The estimated percent yield will generally be above 90%.

The amount of water charged to the process is generally adjusted to give maximum vessel productivity consistent with a low slurry viscosity for maintaining adequate heat transfer and storage. As a result, the amount of water charged will generally vary between 100 to 250 parts by weight per 100 parts of total monomer charged. The lauroyl peroxide is generally varied within narrow ranges to obtain a polymerization cycle of 16 hours or less. Operation in accordance with the above process will provide graft polymerization in which vinyl halide chains are chemically bound to the copolymer backbone. It is important that the copolymer be dissolved in the vinyl halide monomer before polymerization is started. Although if a portion of the copolymer backbone is present as a very fine suspension, grafting can still be effected. Generally, about a 75 minute dissolving period is sufficient at 60° C. If rubbery lumps are evident in the final product, the dissolving period should be increased.

When vinyl halide is polymerized in the presence of the olefin:vinylidene copolymer of the present invention, the resultant product is a mixture of (1) copolymer backbone chains with pendant polyvinyl halide chains (the graft polymer), (2) polyvinyl halide homopolymer and (3) a small amount of unchanged copolymer. The proportion of grafted material in the mixture will depend in part on the ratio of the monomer and copolymer starting materials, the composition of the rubber used and the polymerization temperature and type of initiator employed during the grafting process. Where 60 to 98% by weight of vinyl halide monomer is polymerized in the presence of 40 to 2% by weight of a copolymer of an olefin and vinylidene chloride in accordance with the practice of this invention, the resultant graft product will comprise a mixture of (1) about 2 to 60% by weight of the chemically-combined vinyl halide polymer and olefin:vinylidene chloride copolymer (the grafted polymer), (2) about 98 to 40% by weight of polyvinyl halide homopolymer and (3) less than about 10% by weight of unchanged copolymer.

The polymeric material obtained in the practice of this invention may also be physically admixed with other thermoplastic polymer compositions. A useful composition for the formation of high or medium impact material that can be extruded or calendered at relatively high rates to give high quality products, is one where 20–100% by weight of the blend formed in the practice of this invention is physically admixed with 80–0% by weight of polymers prepared from ethylenically unsaturated monomers such as polyvinyl halide homopolymer, polyvinyl halide copolymers, polyvinylidene chloride, polymethyl methacrylate, styrene acrylonitrile, methylstyrene-acrylonitrile, methyl styrene-styrene-acrylonitrile, butadiene-acrylonitrile, interpolymers and the like. Particularly preferred is polyvinyl halide homopolymer and more particularly polyvinyl chloride homopolymer.

With respect to the copolymer of the present invention, the proportion of the chemically combined olefin will generally range between 40 to 70% by weight based on the total weight of the copolymer. The copolymer will generally have a weight average molecular weight of about 20,000 to 200,000 and may be interpolymerized from the monomers of the olefin and vinylidene chloride by conventional polymerization techniques such as by mass, solution or emulsion polymerization techniques.

The graft polymerization may be accelerated by heat, irradiation and polymerization catalysts. Catalysts which have been found to be useful are monomer-soluble organic peroxides, e.g., benzoyl peroxide, lauroyl peroxide, 2,4-dichlorobenzoyl peroxide, acetyl peroxide, acetyl benzoyl peroxide, or other unsymmetrical peroxides, t-butyl hydroperoxide, alkyl percarbonates, perborates, azo compounds, and mixtures of the same. The quantity of catalyst will generally be varied depending on initiator activity, and on the quantity of monomer and diluent. The polymerizations can also be advantageously carried out in the presence of chain regulators such as chlorinated hydrocarbons, alcohols, aldehydes, etc.

Optional additives, such as stabilizers, fillers, colorants, processing aids, lubricants, co-plasticizers, etc., can be incorporated into the polyblends if desired.

Among the processing aids and co-plasticizers for incorporation into the polyblends are, e.g., methyl methacrylate interpolymers, styrene-acrylonitrile interpolymers, styrene-methyl methacrylate interpolymers, epoxy components, chlorinated paraffins, etc.

The products of this invention are rigid or semi-rigid blends which are useful in preparing rigid and semi-rigid sheets, tubes and molded objects having an optimum balance of high impact and tensile strengths. In particular, these blends are extremely useful where good low temperature properties are required. They are characterized by good flexibility and flow properties at relatively low processing temperatures, high heat distortion point and excellent chemical and solvent resistance. These properties make the products of this invention excellent for many outdoor applications such as corrugated and flat roofing, siding, etc. Examination of samples of the compositions withdrawn from a roll mill after milling times of 5, 10 and 25 minutes shows that they can withstand relatively long milling times without undergoing thermal degradation. They may be calendered, injection molded, extruded, or otherwise fabricated to form rigid sheets, pipes, bottles, structural pieces, wire coatings, etc. When desirable, they can be reinforced, e.g., with asbestos fibers.

It is obvious that many variations may be made in the products and processes set forth above without departing from the spirit and scope of this invention.

What is claimed is:

1. In a process of preparing a graft copolymer blend, the steps comprising: (1) dissolving 40.0 to 2.0 percent by weight of a copolymer consisting of an olefin of the ethylene series and vinylidene chloride in 60.0 to 98.0 percent by weight of ethylenically unsaturated monomer, said olefin having a carbon content of from 2 to 8 carbon atoms and constituting from 40.0 to 70.0 percent of the total weight of said copolymer and said ethylenically unsaturated monomer comprising at least 80.0 percent by weight of a vinyl halide and up to 20.0 percent of other ethylenically unsaturated monomers copolymerizable therewith; (2) admixing the mixture of step (1) with heated water and a suspending agent while maintaining a substantial absence of oxygen to provide a suspension of the monomer and copolymer, the temperature of said water being 20° to 100° centigrade and the quantity thereof being 100 to 250 parts by weight per 100 parts of said ethylenically unsaturated monomer; and (3) agitating the resultant suspension at a temperature of about 10° to 80° centigrade under polymerization conditions until polymerization is substantially complete to produce a graft copolymer blend.

2. The process of claim 1 wherein said olefin is ethylene.

3. The process of claim 1 wherein said ethylenically unsaturated monomer is substantially entirely vinyl chloride.

4. The process of claim 1 wherein the olefin of said copolymer is ethylene and the copolymer is present in an amount of about 20.0 to 5.0 percent by weight and wherein said monomer is vinyl chloride in the amount of 80.0 to 95.0 percent by weight.

5. The graft copolymer blend prepared in accordance with the process of claim 1.

References Cited

UNITED STATES PATENTS

| | | | |
|---|---|---|---|
| 2,397,260 | 3/1946 | Hanford et al. | 260—87.7 |
| 2,837,496 | 6/1958 | Vandenberg | 260—878 |
| 2,947,719 | 8/1960 | Rugg et al. | 260—878 |
| 3,085,082 | 4/1963 | Baer et al. | 260—897 |
| 3,112,290 | 11/1963 | Salyer | 260—878 |

FOREIGN PATENTS 852,042   10/1960   Great Britain.

GEORGE F. LESMES, *Primary Examiner.*

MURRAY TILLMAN, *Examiner.*